Jan. 8, 1952  C. H. SOMERSET  2,581,818
PLANING DEVICE
Filed April 13, 1950  2 SHEETS—SHEET 1
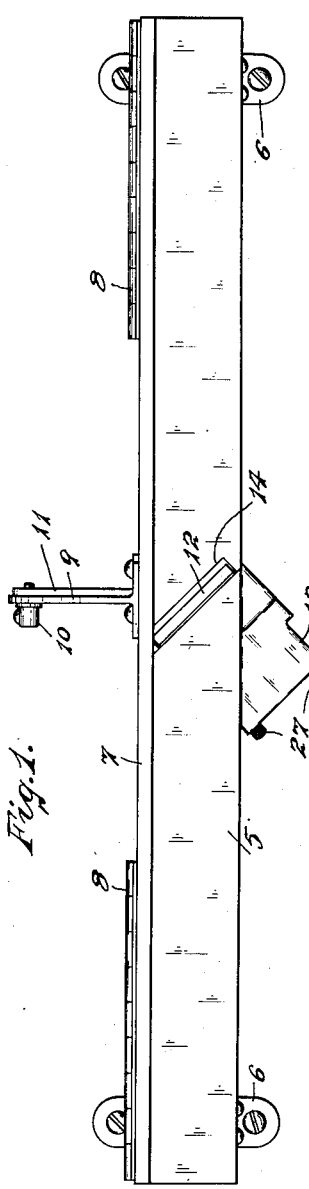
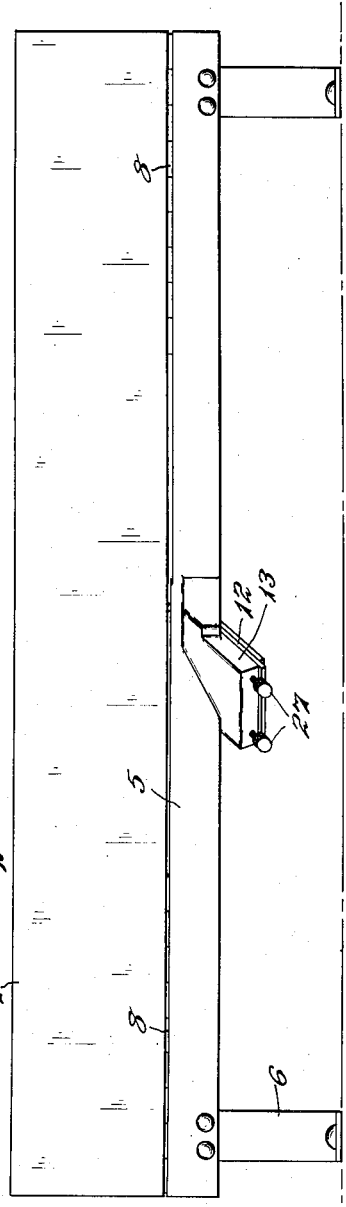
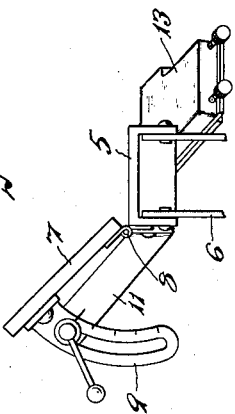
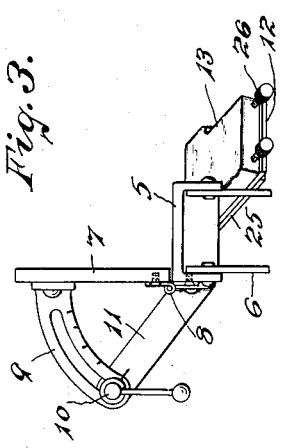
*INVENTOR.*
*CHARLES H. SOMERSET.*
BY
*Louis V. Lucia*
ATTORNEY.

Jan. 8, 1952
C. H. SOMERSET
2,581,818
PLANING DEVICE
Filed April 13, 1950
2 SHEETS—SHEET 2
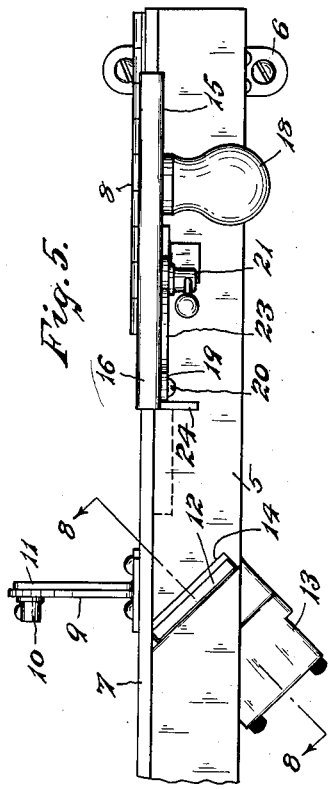
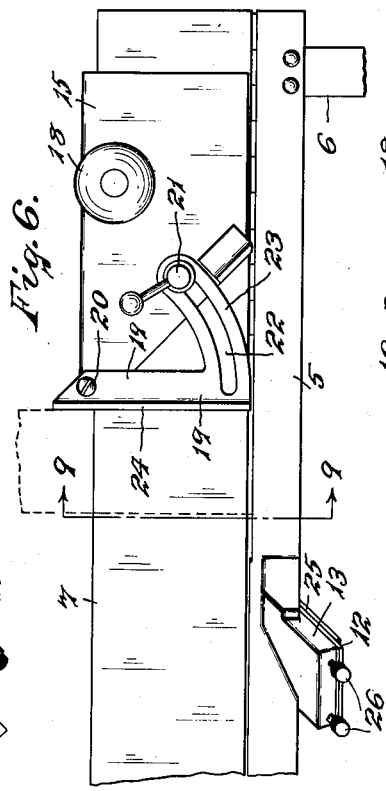
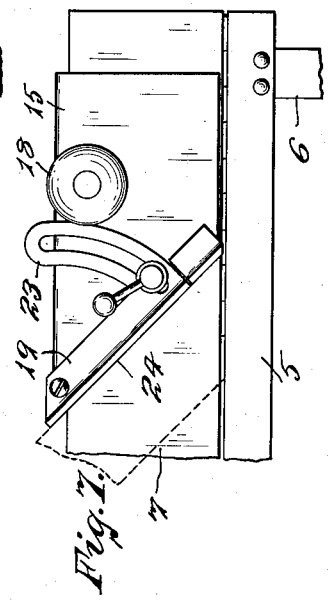
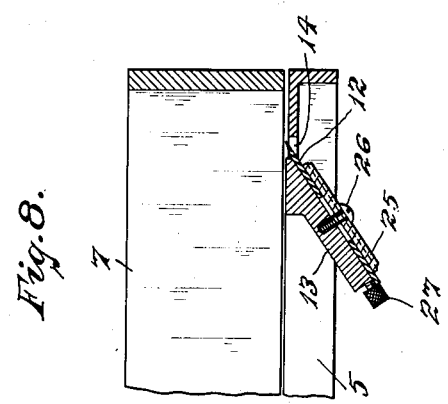
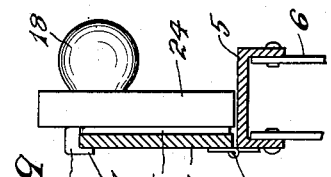
INVENTOR.
CHARLES H. SOMERSET.
BY
*Louis V. Lucia*
ATTORNEY.

Patented Jan. 8, 1952

2,581,818

UNITED STATES PATENT OFFICE 2,581,818

PLANING DEVICE

Charles H. Somerset, Hartford, Conn.

Application April 13, 1950, Serial No. 155,598

3 Claims. (Cl. 144—114)

This invention relates to a planing device and more particularly to a device for planing articles of wood or the like.

An object of the present invention is to provide a planing device for performing a planing operation which will result in a fine and accurate finish on the piece planed thereby.

A further object of this invention is the provision of a novel device in which highly accurate planing operations may be performed manually.

A still further object of the invention is the provision of a novel planing device having means for adjusting and retaining the work at different angles for planing operations.

Further objects and advantages of the present invention will be more clearly understood from the following description and the accompanying drawings in which:

Fig. 1 is a plan view of a planing device embodying my invention.

Fig. 2 is a side view of said device.

Fig. 3 is an end view thereof.

Fig. 4 is a similar view showing the guide plate adjusted for angular planing.

Fig. 5 is a plan view of the device showing the work handling mechanism mounted thereon.

Fig. 6 is a side view thereof.

Fig. 7 is a similar view but showing the said mechanism adjusted for angular planing.

Fig. 8 is a side view in vertical section on line 8—8 of Fig. 5.

Fig. 9 is a sectional end view on line 9—9 of Fig. 6.

In the embodiment of my invention illustrated in the drawings, my improved planing device comprises an elongated table 5 which is preferably mounted on legs 6 and has a guide plate, or fence 7, that is hinged to the table by means of hinges 8—8. The said guide plate is retained in adjusted angular position relatively to the table 5 by means of a bracket 9 that extends backwardly from the guide plate 7 and is slotted to receive a clamping screw 10 which projects through the slot and is threaded to a supporting arm 11 that is mounted on the table 5 and extends rearwardly therefrom to support the plate 7 in any desired angular position relatively to the said table 5.

The said device of my present invention is particularly intended to produce a highly finished planed surface on a piece of wood or the like and, in order to accomplish this, I provide a cutter blade 12 which is mounted upon a blade holder portion 13 that is integral with the table 5 and extends angularly to the surface thereof both longitudinally and laterally, so that the said blade projects through an angular slot 14 in the table 5, and the straight cutting edge thereof is positioned parallel to the surface of the table 5 and at an angle towards the front surface of the guide plate 7 in the direction towards which the work is moved for a planing operation.

In order to support a piece of work relatively to the cutting blade and to move the said piece for a planing operation, I provide a work holding and moving mechanism, preferably including a supporting plate 15 which is slidably mounted over the upper edge of the guide plate 7 by means of a flange 16 having a downwardly projecting lip 17 that engages the rearward side of the said guide plate. The said plate 15 is provided with a suitable handle 18, by means of which it is manually moved on the guide plate to push a piece of work over the cutting edge of the blade 12, and also with an angle adjustment in the form of a bracket 19 which is pivotally mounted to the plate 15 as at 20 and may be secured in adjusted position by means of a clamping screw 21 which extends through a slot 22 on an extension 23 from said bracket and is threaded to the said supporting plate 15. This bracket 19 is constructed with a perpendicular flange 24 that engages the work piece being planed and retains said work piece, with relation to the surface of the table 5 and the edge of the blade 12, at the angle for which the bracket 19 has been adjusted.

When a piece of wood or the like is to be planed on my improved planing device, the said piece is placed upon the table 5 and held with one hand against the front surface of the guide plate 7 and the front surface of the bracket 19, as indicated in dotted lines in Figs. 5 to 7. The supporting plate 15 is then slid forwardly, by means of the handle 18, and the piece of work is thus pushed into contact with the cutting edge of the blade and moved over said blade for a planing operation.

It will be noted that as the work is pushed forwardly, the angle of the cutting edge of the blade, with relation to the surface of the guide plate 7, will cause the work to be forced against the said surface of the guide plate and thereby facilitates the holding of the piece in the proper position during the planing operation. It will also be noted that, when the angle adjustment bracket 19 is adjusted for a desired angle, such as illustrated in Fig. 7, it will hold the work piece at the desired angle with relation to the cutting edge of the blade so that the surface which is to be planed is firmly held for an accurate planing operation.

As clearly illustrated in Figs. 6 and 8, the front portion of the work supporting surface of the table is at a lower plane than the rear portion of said surface which extends rearwardly of the said cutting edge. This permits the rear portion of said supporting surface to properly support the work piece by engagement with the surface of said piece that has been planed by the cutting edge of the blade and is then at a higher plane than the unplaned portion of the said surface.

As shown in Fig. 8, the cutting blade 12 is preferably secured to the portion 13 by means of a clamping plate 25 which is secured to said portion by a clamping screw 26 that extends through a slot in the cutting blade and is threaded to said portion. The said blade may also be adjusted longitudinally by means of adjusting screws 27 so that the cutting edge of the blade will be located at the proper plane with relation to the supporting surface of the table 5.

My improved planing device has been found highly efficient for producing finished planed surfaces which are so smooth and accurate, that no further finishing or fitting operation is required.

I claim:

1. A planing device comprising a table having a work supporting surface, a cutting blade extending through said table and having a cutting edge substantially on a plane with the said supporting surface, a guide plate for guiding a piece of work upon said surface, and means movably mounted on said guide plate for moving said piece of work towards and over the said cutting edge for a planing operation; said movably mounted means having a work engaging surface which is angularly adjustable to thereby retain said work at different angles with respect to said work supporting surface.

2. A planing device comprising a table having a work supporting surface, a cutting blade extending through said table and having a cutting edge adjacent said surface, a guide plate hingedly secured to the said table adjacent one side of the blade, adjustable means for securing said guide plate at different angles relatively to said supporting surface and cutting edge, a work moving mechanism including a pusher member movable along the side of said guide plate and slidably supported upon the upper free edge thereof, a handle on said member for manually moving it along said guide plate, a bracket pivotally mounted on said pusher member and having a work engaging surface extending at right angles thereto; said bracket being adjustable to vary the angle of the said work engaging surface to the table to thereby permit the planing of a piece of work at different angles, and means on said pusher member for securing the bracket in adjusted position.

3. A planing device comprising a table having a work supporting surface, a planing blade extending through an opening in said table and having a cutting edge disposed in planing position relatively to said supporting surface, a guide plate upon said table having a guide surface adjacent one end of said cutting edge, and manually operable means including a work positioning member slidable along said guide surface and angularly adjustable relatively to the work supporting surface of the table about an axis perpendicular to said guide surface to thereby position the work piece at different angles relatively to the said work supporting surface.

CHARLES H. SOMERSET.

REFERENCES CITED

The following references are of record in the file of this patent:

UNITED STATES PATENTS

| Number | Name | Date |
|---|---|---|
| 701,724 | Hewitt | June 3, 1902 |
| 1,009,688 | Peterson et al. | Nov. 21, 1911 |
| 1,736,641 | Zimmerman | Nov. 19, 1929 |
| 1,831,124 | Koster | Nov. 10, 1931 |
| 2,015,734 | Tautz | Oct. 1, 1935 |
| 2,329,890 | Fisher | Sept. 21, 1943 |
| 2,410,467 | Valentine | Nov. 5, 1946 |

FOREIGN PATENTS

| Number | Country | Date |
|---|---|---|
| 21,163 | Great Britain | of 1896 |
| 185,254 | Great Britain | Sept. 7, 1922 |